(12) United States Patent
Jung (10) Patent No.: US 7,841,760 B2
(45) Date of Patent: Nov. 30, 2010

(54) BACKLIGHT UNIT AND DISPLAY APPARATUS

(75) Inventor: Il-yong Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 12/142,003

(22) Filed: Jun. 19, 2008

(65) Prior Publication Data
US 2009/0109702 A1    Apr. 30, 2009

(30) Foreign Application Priority Data
Oct. 31, 2007    (KR) .................. 10-2007-0110393

(51) Int. Cl.
*F21V 7/05* (2006.01)
(52) U.S. Cl. ..................... 362/624; 362/606
(58) Field of Classification Search ............ 362/600, 362/606, 609, 623, 625, 624
See application file for complete search history.

(56) References Cited

U.S. PATENT DOCUMENTS

| | | | |
|---|---|---|---|
| 5,408,388 A | 4/1995 | Kobayashi et al. | |
| 5,949,505 A * | 9/1999 | Funamoto et al. | 362/628 |
| 7,088,333 B1 | 8/2006 | Manabe et al. | |
| 7,270,463 B2 * | 9/2007 | Yasuda et al. | 362/610 |
| 2004/0071436 A1 | 4/2004 | Kwon | |

FOREIGN PATENT DOCUMENTS

| | | |
|---|---|---|
| JP | 7-333444 | 12/1995 |
| JP | 11-174448 | 7/1999 |
| KR | 2004-72743 | 8/2004 |

OTHER PUBLICATIONS

European Search Report issued Dec. 9, 2009 in EP Application No. 08167358.4.

\* cited by examiner

*Primary Examiner*—David V Bruce
(74) *Attorney, Agent, or Firm*—Stanzione & Kim, LLP (57) ABSTRACT

A backlight unit includes a light guide panel to guide entering light, a light source disposed on at least one side of the light guide panel to emit light, and a reflecting sheet disposed on a surface of the light guide panel to reflect the entering light toward a light emitting plane of the light guide panel, and includes a plurality of reflecting areas which have different reflectance, where a reflecting area of the plurality of reflecting areas which encounters a relatively large amount of the entering light has a higher reflectance than that of a reflecting area of the plurality of reflecting areas which encounters a relatively small amount of the entering light.

24 Claims, 8 Drawing Sheets

BACKLIGHT UNIT AND DISPLAY APPARATUS

CROSS-REFERENCE TO RELATED APPLICATIONS

This application claims priority under 35 U.S.C. §119(a) from Korean Patent Application No. 10-2007-0110393, filed on Oct. 31, 2007 in the Korean Intellectual Property Office, the disclosure of which is incorporated herein by reference in its entirety.

BACKGROUND OF THE INVENTION

1. Field of the Invention

The present general inventive concept relates to a backlight unit of an edge light type, and more particularly, to a backlight unit improving non-uniformity of brightness due to the disposition and the shape of a light source, and increasing a light efficiency thereof.

2. Description of the Related Art

In general, a liquid crystal display apparatus, as one of a light receiving type display apparatus, is incapable of emitting light by itself. Thus, the liquid crystal display apparatus forms an image using an illuminating light emitted from the outside. For this, a backlight unit to illuminate a light is disposed at a rear surface of the liquid crystal display apparatus.

A backlight unit may be classified as a direct light type or an edge light type. In the direct light type, a lamp disposed directly under a liquid crystal panel directly emits light upward to the liquid crystal panel. In the edge light type, a lamp disposed at an edge of a light guide panel (LGP) emits a light, and the emitted light is transmitted to the liquid crystal panel through the light guide panel.

Figure 1:
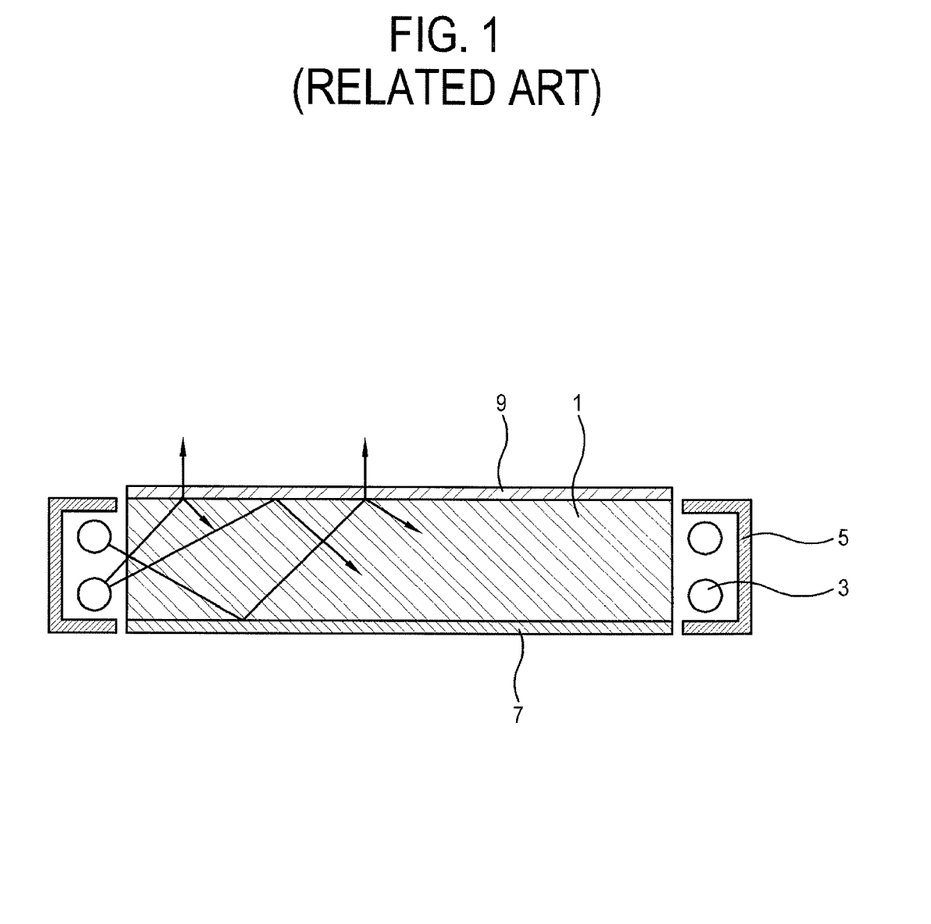
FIG. 1 is a schematic sectional view illustrating a conventional backlight unit of an edge light type display apparatus.

FIG. 1 is a schematic sectional view illustrating a conventional backlight unit of the edge light type.

As illustrated therein, a cold cathode fluorescent lamp (hereinafter, referred to 'CCFL') 3, and a reflecting mirror 5 reflecting light emitted from the CCFL 3, are disposed at opposite edge parts of a light guide panel (hereinafter, referred to 'LGP') 1. Also, a reflecting sheet 7 is formed on a lower surface of the LGP 1. The reflecting sheet 7 reflects light entering from the CCFL 3 toward the liquid crystal panel. Accordingly, the light emitted from the CCFL 3 enters the LGP 1 through an edge. This entering light is converted into a surface light by means of the reflecting sheet 7 to be emitted to an upper surface of the LGP 1.

Also, an optical sheet 9 correcting a proceeding path of the emitted surface light is provided at an upper surface of the LGP 1.

The quantity and length of the CCFL 3 are determined according to a standard of the LGP 1. The CCFL 3 is a line light source provided on at least one side of four sides of the LGP 1.

Figure 2:
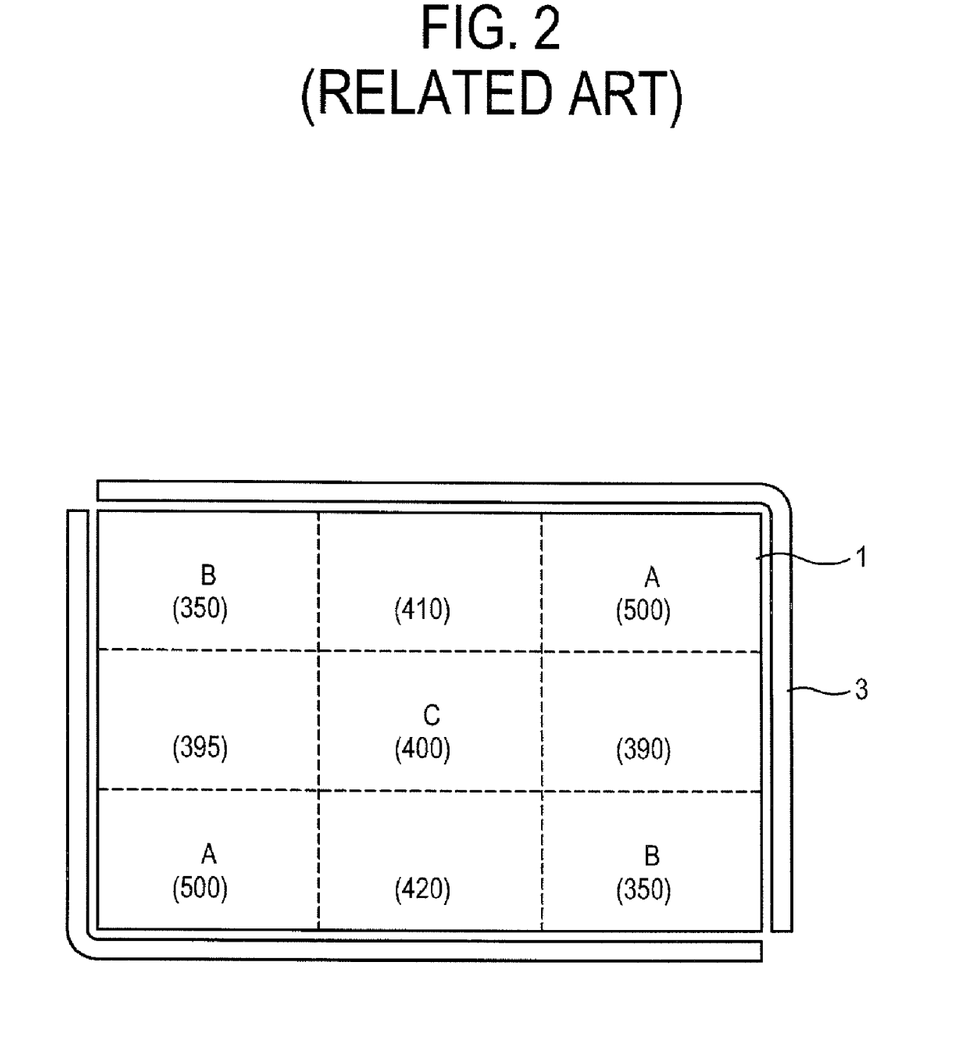
FIG. 2 illustrates a configuration of a cold cathode fluorescent lamp (CCFL) of the conventional backlight unit of FIG. 1.

FIG. 2 illustrates a configuration of the CCFL 3 having an 'L' shape, and disposed to illuminate light to all four sides of the LGP 1. In this case, since the CCFL 3 is disposed on all four sides of the LGP 1, a high brightness can be obtained in comparison to the backlight unit having the CCFL which is disposed to only an edge of the LGP 1.

Also, related to the shape and disposition of the CCFL 3, as illustrated in FIG. 2, if two CCFLs 3 of the 'L' shape are used, an area A of the backlight unit corresponding to a bent portion of the CCFL 3 receives an exceeding amount of the light to become a bright portion having a high brightness, and a portion B of the backlight unit corresponding to an end part of each CCFL 3 receives an insufficient amount of the light and thus becomes a dark portion having low brightness.

Accordingly, as illustrated in FIG. 2, related to a brightness distribution of the surface light emitted from the LGP 1, the area A is brighter than an area C representing a central part of the backlight unit, and the area B is darker than the area C, so that light having a uniform brightness is incapable of being totally illuminated. In FIG. 2, numbers indicated inside the other areas represent an average brightness value of each respective area, and the unit of measure thereof is candela per meter squared ($cd/m^2$) which is a standard unit of luminance.

SUMMARY OF THE INVENTION

The present general inventive concept provides a backlight unit to improve a light efficiency, and to improve non-uniformity of brightness due to a disposition and shape of a light source.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a backlight unit, including a light guide panel to guide an entering light, a light source disposed on at least one side of the light guide panel, to emit light, and a reflecting sheet which is disposed on a surface of the light guide panel to reflect the entering light toward a light emitting plane of the light guide panel, and includes a plurality of reflecting areas which have different reflectance, where a reflecting area of the plurality of reflecting areas which encounter a relatively large amount of the entering light has a higher reflectance than that of a reflecting area of the plurality of reflecting areas which encounters a relatively small amount of the entering light.

The light source may include a lamp to emit the light, and a reflecting mirror disposed on a side of the lamp to reflect the entering light toward the light guide panel.

The lamp may include a first light emitting unit disposed to face a first side of the light guide panel, and a second light emitting unit which is integrally formed with and disposed adjacent to a side of the first light emitting unit, and is disposed to face a second side of the light guide panel which is adjacent to the first side.

The reflecting sheet may include a first reflecting area disposed in proximity to a light emitting portion of the lamp where the first light emitting unit and the second light emitting unit are adjacent to each other, and a second reflecting area disposed in proximity to at least one of an end part of the first light emitting unit and an end part of the second light emitting unit, and where the first reflecting area may have a higher reflectance than that of the second reflecting area.

The reflecting sheet may include a third reflecting area disposed between the first reflecting area and the second reflecting area, and where the third reflecting area may have a lower reflectance than that of the first reflecting area, and may have a higher reflectance than that of the second reflecting area.

The reflecting sheet may be provided such that the reflecting area of the plurality of reflecting areas which encounters the relatively large amount of the entering light has a lower scattering ratio than that of the reflecting area of the plurality of reflecting areas which encounters the relatively small amount of the entering light.

The reflecting sheet may further include a scattering pattern which is formed on at least one area of the plurality of reflecting areas to adjust the scattering ratio of the entering light.

The foregoing and/or other aspects and utilities of the present general inventive concept can also be achieved by providing a backlight unit, including a light guide panel to guide an entering light, a light source disposed on at least one side of the light guide panel, and to emit light, and a chassis to accommodate the light source and the light guide panel, and includes a reflecting plane disposed on a surface of the chassis which faces the light guide panel, and is divided into a plurality of reflecting areas which have different illuminations, where the reflecting plane is provided so that a reflecting area of the plurality of reflecting areas which encounters a relatively large amount of the entering light has a lower surface roughness than that of a reflecting area of the plurality of reflecting areas which encounters a relatively small amount of the entering light.

The light source may include a lamp to emit the light, and a reflecting mirror disposed on a side of the lamp to reflect the entering light toward the light guide panel.

The lamp may include a first light emitting unit disposed to face a first side of the light guide panel, and a second light emitting unit which is integrally formed with and disposed adjacent to a side of the first light emitting unit, and is disposed to face a second side of the light guide panel which is adjacent to the first side.

The reflecting plane may include a first reflecting area disposed in proximity to a light emitting portion of the lamp where the first light emitting unit and the second light emitting unit are adjacent to each other, and a second reflecting area disposed in proximity to at least one of an end part of the first light emitting unit and an end part of the second light emitting unit, and where the first reflecting area has a lower surface roughness than that of the second reflecting area.

The reflecting plane may include a third reflecting area disposed in a central area of the light guide panel, and where the third reflecting area has a higher surface roughness than that of the second reflecting area.

The foregoing and/or other aspects and utilities of the present general inventive concept can also be achieved by providing a backlight unit including a plurality of light emitting units to emit light, and a light guide to guide the light, the light guide including a plurality of light reflecting areas to each reflect the light emitted from the plurality of light emitting units in proportion to an amount of emitted light encountered by each of the plurality of light reflecting areas, and a totality of the light reflected by the plurality of reflecting areas is a uniform reflected light.

The light guide may include a light emitting plane disposed on a surface of the light guide to correct the reflected light output to provide a uniform reflected light.

An optical sheet may be disposed in proximity to the light emitting plane to provide the correction of the reflected light output.

Light reflecting areas which encounter a higher amount of emitted light from the plurality of light emitting units have a lower associated surface roughness and a higher associated reflectance than light reflecting areas which encounter a lower amount of emitted light from the plurality of light emitting units.

The foregoing and/or other aspects and utilities of the present general inventive concept can also be achieved by providing a backlight unit, including a lamp having a continuous portion and a discontinuous portion, and a light guide having a reflecting unit having a first area having a first reflectance to correspond to the continuous portion, and a second area having a second reflectance to correspond to the discontinuous portion, to guide the light emitted from the lamp.

The continuous portion may include a plurality of continuous sub-portions disposed apart from each other by a distance which corresponds to the discontinuous portion, where the first area of the reflecting unit is disposed adjacent to the continuous portion, and the second area of the reflecting unit is disposed adjacent to the discontinuous portion.

The first reflectance may be higher than the second reflectance.

The backlight unit may further include a light guide panel disposed above the reflecting unit and in close proximity to the lamp such that light emitted from the lamp is reflected by the reflecting unit, and the light emitted from the lamp and reflected by the reflecting unit is guided to outside the backlight unit.

The first area may have a first scattering ratio, and the second area may have a second scattering ratio, wherein the first scattering ratio of the first area is lower than that of the second area.

The first area may include a plurality of sub-areas each having a different reflecting ratio.

The foregoing and/or other aspects and utilities of the present general inventive concept can also be achieved by providing a display apparatus, including a display panel to form an image thereon, and a backlight unit having a lamp having a continuous portion and a discontinuous portion, and a light guide having a reflecting unit having a first area having a first reflectance to correspond to the continuous portion, and a second area having a second reflectance to correspond to the discontinuous portion, to guide the light emitted from the lamp.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures.

Figure 3:
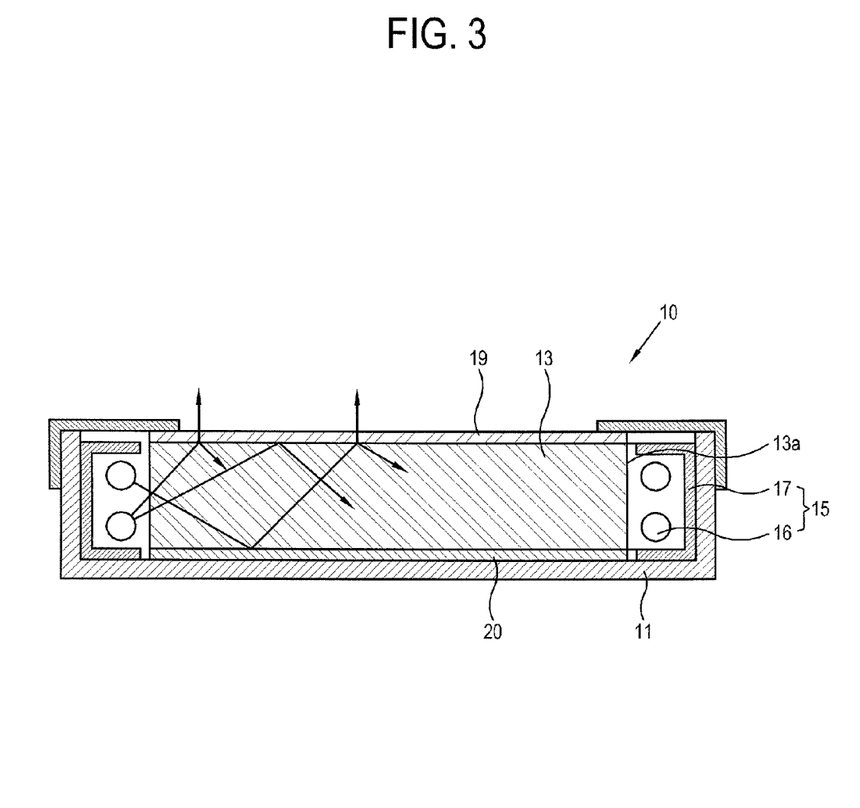
FIG. 3 is a schematic sectional view illustrating a backlight unit according to an embodiment of the present general inventive concept.

FIG. 3 is a schematic sectional view illustrating a backlight unit 10 usable with a display apparatus 100 (referring to FIG. 8) according to an embodiment of the present general inventive concept.

As illustrated in FIG. 3, a backlight unit 10 according to an embodiment of the present general inventive concept includes a light guide panel (hereinafter, referred to 'LGP') 13 to guide entering light, a light source 15 disposed on at least one side of the LGP 13, and a reflecting sheet 20 disposed on a lower surface of the LGP 13. Also, the backlight unit 10 according to the present embodiment may include a chassis 11 on which the LGP 13, the light source 15 and the reflecting sheet 20 are disposed.

The light source 15 illuminates light toward the LGP 13 from a first side portion 13a of the light guide panel 13, and includes a lamp 16 to emit the light, and a reflector 17 disposed between the lamp 16 and the chassis 11. The reflector 17 may be disposed to face the LGP 13 to reflect the light emitted from the lamp 16 toward the LGP 13. The backlight unit 10 may include an optical sheet 19 disposed at an upper portion of the backlight unit 10 to correct light being emitted through the LGP 13, as described below in more detail, toward the display panel unit 80 (referring to FIG. 8) to form an image on the display panel unit 80 using the light emitted from the backlight unit 10. In another embodiment, the backlight unit 10 of the display apparatus 100 does not include the optical sheet 19.

Figure 4:
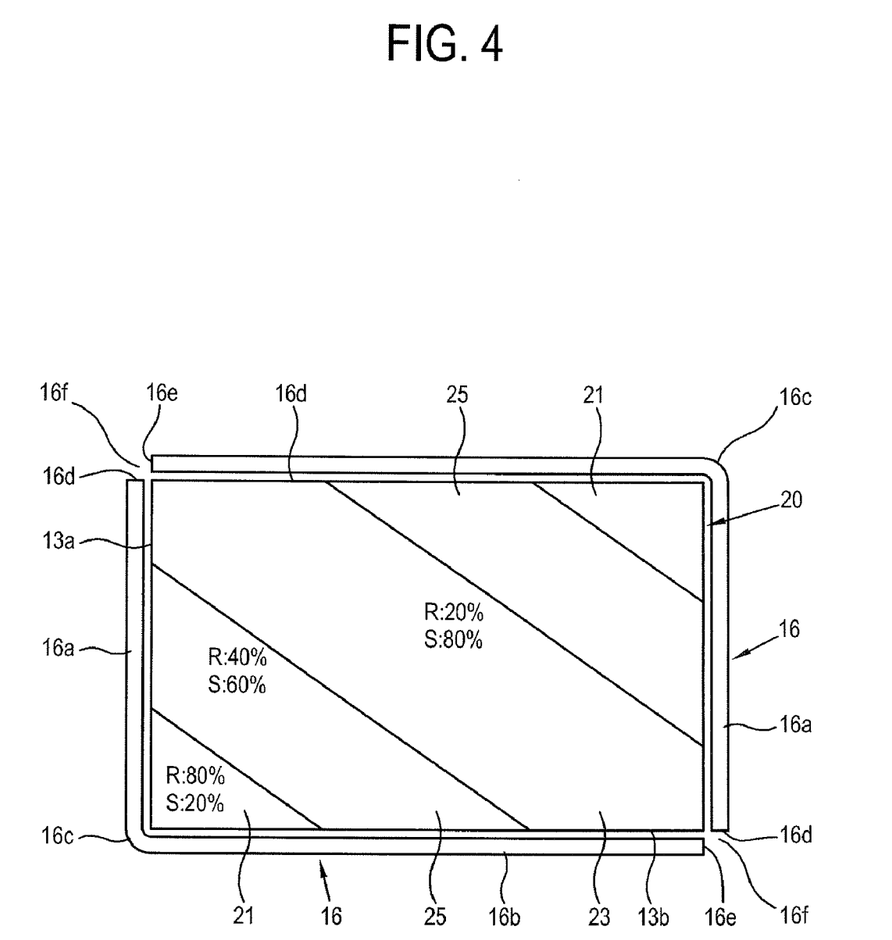
FIG. 4 is a schematic view illustrating a configuration of a lamp and a reflecting sheet according to an embodiment of the backlight unit illustrated in FIG. 3.

FIG. 4 is a schematic view illustrating a configuration of the lamp 16 and the reflecting sheet 20 according to an embodiment of the backlight unit illustrated in FIG. 3.

As illustrated in FIG. 4, the lamp 16 may have an 'L' shape, and may include first and second light emitting units 16a and 16b divided according to a disposing position thereof. The first light emitting unit 16a may face the first side portion 13a of the LGP 13 (referring to FIG. 3). Also, as illustrated, the second light emitting unit 16b may be integrally formed with the first light emitting unit 16a and may be disposed adjacent to the first light emitting unit 16a, to face a second side portion 13b of the LGP 13 adjacent to the first side portion 13a, which may be accomplished, for example, by bending the lamp 16. Also, in another embodiment, a plurality of lamps 16 may be provided so that the light emitting units 16a and 16b can be respectively disposed on four sides of the LGP 13, where a pair of the light emitting units 16a and 16b are included for each of the plurality of lamps 16.

In the present embodiment illustrated in FIG. 4, the lamp 16 has an 'L' shape. Alternatively, the lamp 16 may have an 'I' shape, or a '☐' shape having a portion which is open.

Referring to FIG. 3, the reflecting sheet 20 reflects light supplied via the LGP 13 toward a light emitting plane of the LGP 13 to guide the illuminating light to enter all areas of the LGP 13. The reflecting sheet 20 according to an embodiment illustrated in FIG. 4 has a plurality of reflecting areas having different reflectance R. Among the plurality of reflecting areas, a reflecting area which encounters a relatively large amount of entering light has a higher reflectance R than that of a reflecting area which encounters a smaller amount of the entering light.

In greater detail, referring to FIG. 4, the reflecting sheet 20 includes a first reflecting area 21 and a second reflecting area 23. The first reflecting area 21 is disposed adjacent to each of a plurality of corner light emitting portions 16c which are each disposed, for example, between a respective first light emitting unit 16a and second light emitting unit 16b of lamp 16. Each pair of first and second light emitting units 16a and 16b may be integrally formed with each other and bent away from each other, such that a corner light emitting portion 16c of the lamp 16 is disposed at the bent portion between the first and second light emitting units 16a and 16b.

The second reflecting area 23 is disposed, for example, adjacent to a first end part 16d of a respective first light emitting unit 16a and may extend across the reflecting sheet 20 to a location adjacent to a second end part 16e of the respective second light emitting unit 16b. The first end part 16d and the second end part 16e are each disposed at the location of a gap portion 16f of the lamp 16. Also, the first reflecting area 21 and the second reflecting area 23 may reflect light not only to a portion of the LGP 13, which is positioned directly above the first and second reflecting areas 21 and 23, but to other portions of the reflecting sheet 20, as well, according to Snell's law.

The first reflecting area 21 may have a higher reflectance R than that of the second reflecting area 23. For example, as illustrated in FIG. 4, the reflectance R of the first reflecting area 21, disposed adjacent to the corner light emitting portion 16c, may be 80%, and the reflectance R of the second reflecting area 23, disposed adjacent to the second end part 16e of the second light emitting unit 16b, may be 20%. To make a different reflectance R of the first reflecting area 21 (or of the second reflecting area 23), a surface illumination of the reflecting sheet 20 may be determined such that a reflectance R may be different for the different reflecting areas of the reflecting sheet 20.

As describe above, the reflecting sheet 20 may be divided into a plurality of reflecting areas, such that the reflectance R of the first reflecting area 21 may be determined to be relatively high (for example, 80%), and the reflectance R of the second reflecting area 23 may be determined to be relatively low (for example, 20%). This indicates that a light entering an area having a large amount among an entering light is reflected by the second reflecting area 23 with a relatively low reflectance to an area of the LGP 13 different from a direct upward area of the first reflecting area 21. Also, the light entering an area having a small amount of the entering light is reflected with a relatively high reflectance. Accordingly, the brightness non-uniformity problem associated with the conventional backlight unit can be resolved with the reflecting sheet 20 of the light emitting plane of the LGP 13 of the present general inventive concept.

As illustrated in FIG. 4, the reflecting sheet 20 may further include a third reflecting area 25 provided between a respective first reflecting area 21 and second reflecting area 23. The third reflecting area 25 may have a lower reflectance R than that of the first reflecting area 21, and may have a higher reflectance R than that of the second reflecting area 23. For example, the third reflecting area 25 may have the reflectance R of 40%. In this case, the reflecting sheet 20 may be divided into a plurality of areas, and the plurality of areas have different reflectance R so that the brightness non-uniformity problem of the conventional backlight unit, described above, and caused due to the shape of the disposition of the lamp 16, can be resolved. In any case, the reflectance R of the first, second and third reflection areas 21, 23 and 25 are different from each other.

In the reflecting sheet 20 according to the present embodiment, among the plurality of reflecting areas, a reflecting area having a relatively large amount of the entering light may have a lower scattering ratio than that of a reflecting area having a relatively small amount of the entering light. For example, as illustrated in FIG. 4, the scattering ratios S of the first, third and second reflecting areas 21, 25 and 23 may be respectively 20%, 60% and 80%. As describe above, if the scattering ratio is determined to be different, the substantially same effect as the case of making the reflection ratio different can be obtained.

Figure 5:
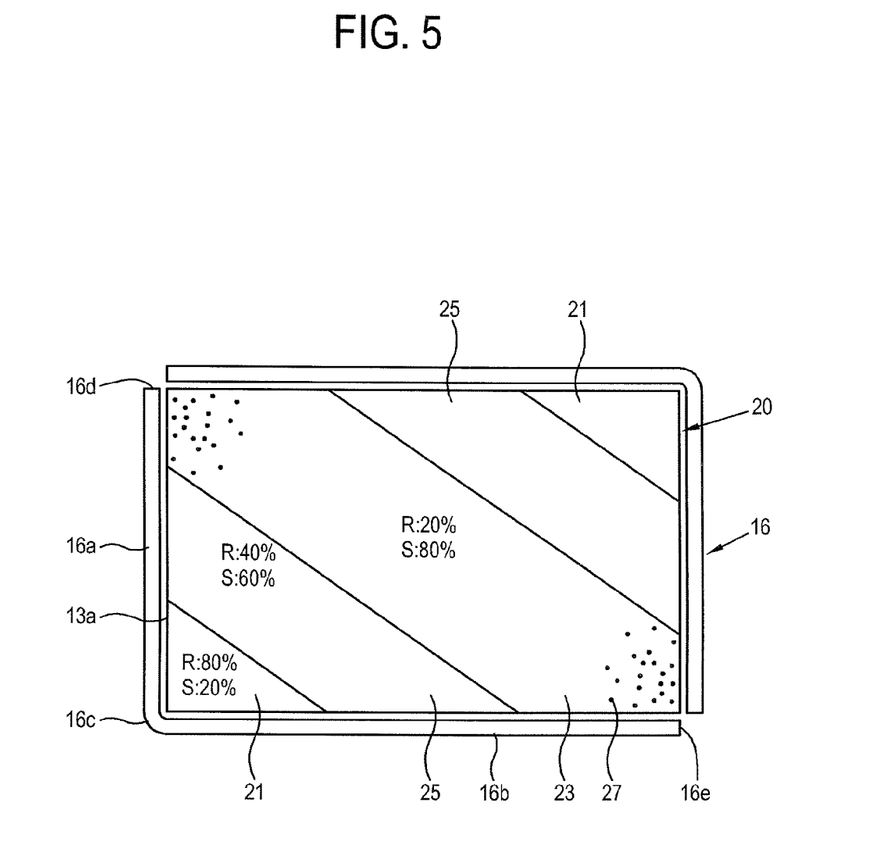
FIG. 5 is a schematic view illustrating a configuration of a lamp and a reflecting sheet according to an embodiment of the backlight unit illustrated in FIG. 3.

FIG. 5 is a schematic view illustrating a configuration of a lamp and a reflecting sheet according to an embodiment of the backlight unit illustrated in FIG. 3.

As illustrated in FIG. 5, the reflecting sheet 20 may include a scattering pattern 27 formed in at least one area of the plurality of reflecting areas to be used to adjust the scattering ratio of entering light. The scattering pattern 27 may be formed in a predetermined reflecting area, for example, to the second reflecting area 23, to be used to adjust the scattering ratio therein.

As described above, the backlight unit 10 according to the embodiment of the present general inventive concept illustrated in FIG. 3, may include an optical sheet 19 disposed on, or in close proximity to, the light emitting plane of the LGP 13. The optical sheet 19 corrects a proceeding path of surface light emitted by the LGP 13 through the light emitting plane such that the emitted light is a uniform light.

Figure 6:
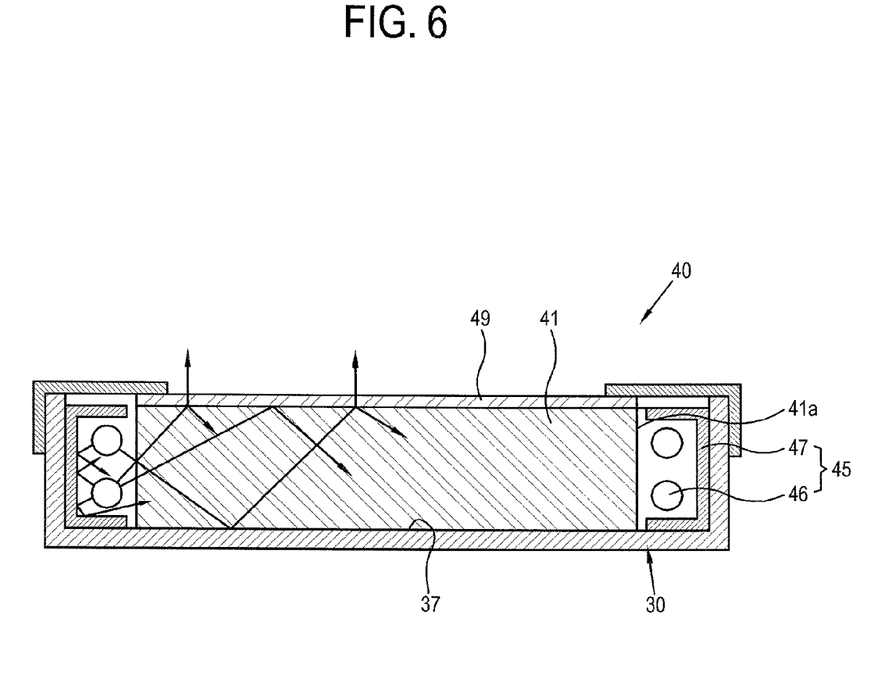
FIG. 6 is a schematic sectional view illustrating a backlight unit according to an embodiment of the present general inventive concept.
Figure 7:
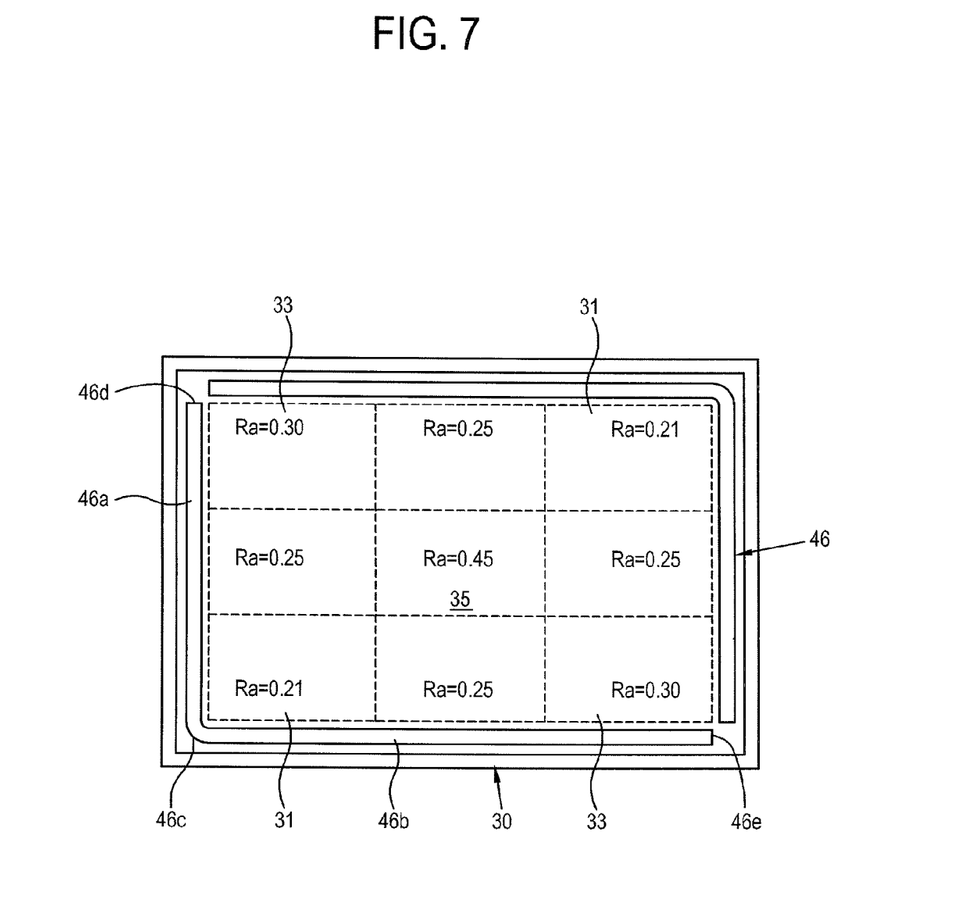
FIG. 7 is a schematic view illustrating a configuration of a lamp and a chassis of an embodiment of the backlight unit illustrated in FIG. 6.

FIG. 6 is a schematic sectional view illustrating a backlight unit 40 according to an embodiment of the present general inventive concept, and FIG. 7 is a schematic view illustrating a configuration of a lamp 46 and a chassis 30 of the backlight unit 40 illustrated in FIG. 6.

Referring to FIGS. 6 and 7, the backlight unit 40 according to this embodiment includes an LGP 41 to guide an entering light, a light source 45 disposed on at least a first side portion 41*a* of the LGP 41, and a chassis 30 on which to dispose the light source 45 and the LGP 41. The backlight unit 40 may include an optical sheet 49 provided on, or in close proximity to, a light emitting plane of the LGP 41 to correct a proceeding path of surface light emitted by the LGP 41 through the light emitting plane such that the emitted light is a uniform light.

Compared to the backlight unit 10 of FIG. 3, the backlight unit 40 of FIG. 6 does not include the reflecting sheet 20, and instead forms a reflecting plane 37 on an inner surface of the chassis 30 to perform the function of the reflecting sheet 20. To accomplish this, the chassis 30 and/or the inner surface of the chassis 30 may be formed of material, or coated with a material, having a high reflective property and a high reflectance R, such as polycarbonate.

The light source 45 includes a lamp 46, and a reflecting mirror 47 disposed on a side of the lamp 46 to reflect an entering light toward the LGP 41. The lamp 46 may include a first light emitting unit 46*a* facing a first side portion 41*a* of the LGP 41, and a second light emitting unit 46*b* which may be integrally formed with the first light emitting unit 46*a* and may be disposed adjacent to the first light emitting unit 46*a* to face a second side portion (not shown) of the LGP 41, which may be accomplished by, for example, bending the lamp 46.

The light source 45 of the backlight unit 40 of FIG. 6 may have the same configuration and disposition as the light source 15 of the backlight unit 10 of FIG. 3.

The reflecting plane 37 of the chassis 30 is divided into a plurality of reflecting areas having different illuminations. As described above, the reflecting plane 37 is formed or disposed on the inner surface of the chassis 30 to face the LGP 41. Among the plurality of reflecting areas, a reflecting area which encounters a relatively large amount of entering light has a lower surface roughness than that of a reflecting area which encounters a relatively small amount of entering light.

In detail, the reflecting plane 37 of the chassis 30 may include a first reflecting area 31 disposed in close proximity to light emitting portion 46*c* which is disposed between the first light emitting unit 46*a* and the second light emitting unit 46*b*, and a second reflecting area 33 disposed in close proximity to a first end part 46*d* or a second end part 46*e* of the lamp 46. The first reflecting area 31 may have a lower surface roughness Ra than that of the second reflecting area 33. For example, as illustrated in FIG. 7, the surface roughness Ra of the first reflecting area 31 is 0.21, and the surface roughness Ra of the second reflecting area 33 is 0.30, which is higher than that of the first reflecting area 31.

The reflecting plane 37 may include a third reflecting area 35 disposed in a position facing a central portion the LGP 41. The third area 35 may have a higher surface roughness than that of the second area 33. For example, the surface roughness Ra of the third area 35 may be 0.45.

As described above, the reflecting plane 37 of the chassis 30 may be divided into a plurality of reflecting areas, and the illumination of each reflecting area may be determined to be different, thereby solving the brightness non-uniformity problem of the conventional backlight unit, as described above. Also, the chassis 30, which has a high reflectance, is used to improve a light using efficiency of the backlight unit 40.

As described above, a backlight unit according to the present general inventive concept may divide a reflecting sheet or a reflecting plane of a chassis into a plurality of reflecting areas, and a reflectance is determined of each reflecting area, such that a reflectance or a scattering ratio or illumination of each reflecting area may be different, thereby solving a brightness non-uniformity problem of a conventional backlight unit caused by a configuration and an optical disposition of a lamp disposed therein. Accordingly, a surface light having a uniform brightness can illuminate over all the reflecting areas being applied to a liquid crystal display apparatus, etc.

Also, a light repeatedly internally reflected inside the light guide panel can be reused by means of the reflecting sheet or the reflecting plane instead of being lost, thereby improving a light using efficiency of the backlight unit of the present general inventive concept.

Figure 8:
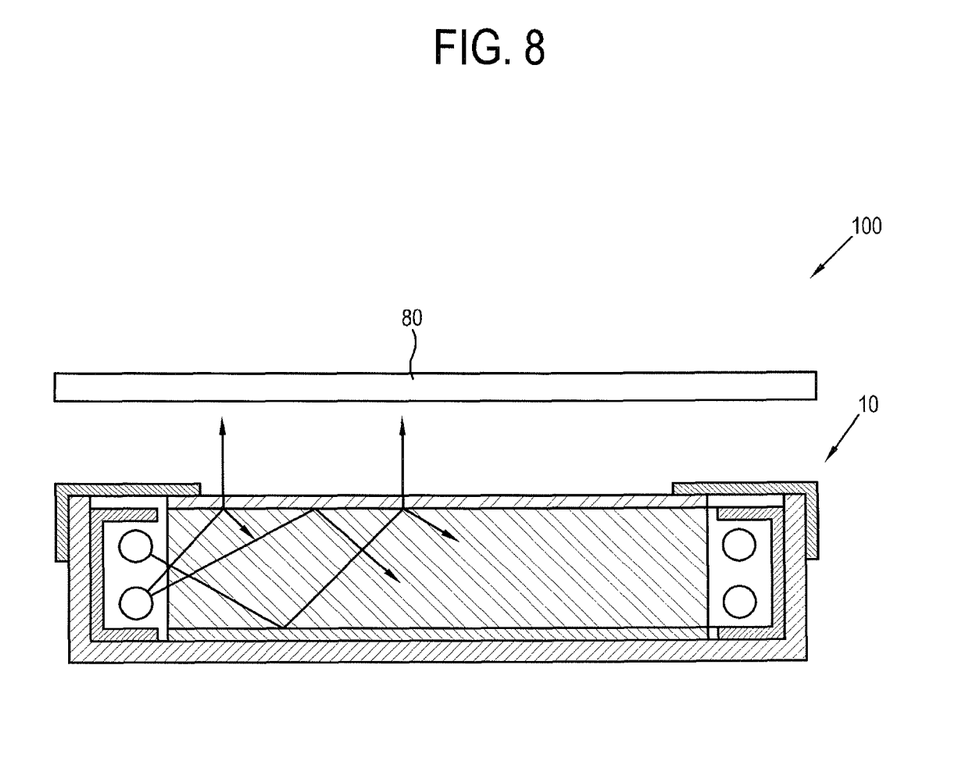
FIG. 8 is a schematic view illustrating a display apparatus according to an embodiment of the present general inventive concept.

FIG. 8 is a schematic view illustrating a display apparatus according to an embodiment of the present general inventive concept.

Referring to FIG. 8, the display apparatus 100 may include a backlight unit 10 and a display panel unit 80 to form an image thereon. The backlight unit 10 projects uniform light toward the display panel to form an image on the display panel unit 80. The light may be guided from the backlight unit 10 to the display panel unit 80 via an LGP 13 or 41 (referring to FIGS. 3 and 6, respectively).

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A backlight unit, comprising:
a light guide panel to guide entering light;
a light source disposed on at least one side of the light guide panel, to emit light; and
a reflecting sheet which is disposed on a surface of the light guide panel to reflect the entering light toward a light emitting plane of the light guide panel, and comprises a plurality of reflecting areas which have different reflectance,
wherein a reflecting area of the plurality of reflecting areas which encounters a relatively large amount of the entering light has a higher reflectance than that of a reflecting area of the plurality of reflecting areas which encounters a relatively small amount of the entering light.

2. The backlight unit according to claim 1, wherein the light source comprises:
a lamp to emit the light; and
a reflecting mirror disposed on a side of the lamp to reflect the entering light toward the light guide panel.

3. The backlight unit according to claim 2, wherein the lamp comprises:
a first light emitting unit disposed to face a first side of the light guide panel; and
a second light emitting unit which is integrally formed with and disposed adjacent to the first light emitting unit, and is disposed to face a second side of the light guide panel which is adjacent to the first side.

4. The backlight unit according to claim 3, wherein:
the reflecting sheet comprises:
a first reflecting area disposed in proximity to a light emitting portion of the lamp where the first light emitting unit and the second light emitting unit are adjacent to each other, and
a second reflecting area disposed in proximity to at least one of an end part of the first light emitting unit and an end part of the second light emitting unit; and
the first reflecting area has a higher reflectance than that of the second reflecting area.

5. The backlight unit according to claim 4, wherein:
the reflecting sheet comprises a third reflecting area disposed between the first reflecting area and the second reflecting area; and
the third reflecting area has a lower reflectance than that of the first reflecting area, and has a higher reflectance than that of the second reflecting area.

6. The backlight unit according to claim 1, wherein the reflecting sheet is provided such that the reflecting area of the plurality of reflecting areas which encounters the relatively large amount of the entering light has a lower scattering ratio than that of the reflecting area of the plurality of reflecting areas which encounters the relatively small amount of the entering light.

7. The backlight unit according to claim 6, wherein the reflecting sheet further comprises:
a scattering pattern which is formed on at least one reflecting area of the plurality of reflecting areas to adjust the scattering ratio of the entering light.

8. A backlight unit, comprising:
a light guide panel to guide entering light;
a light source disposed on at least one side of the light guide panel, and to emit light; and
a chassis to accommodate the light source and the light guide panel, and comprises a reflecting plane disposed on a surface of the chassis which faces the light guide panel, and is divided into a plurality of reflecting areas which have different illuminations,
wherein the reflecting plane is provided so that a reflecting area of the plurality of reflecting areas which encounters a relatively large amount of the entering light has a lower surface roughness than that of a reflecting area of the plurality of reflecting areas which encounters a relatively small amount of the entering light.

9. The backlight unit according to claim 8, wherein the light source comprises:
a lamp to emit the light; and
a reflecting mirror disposed on a side of the lamp to reflect the entering light toward the light guide panel.

10. The backlight unit according to claim 9, wherein the lamp comprises:
a first light emitting unit disposed to face a first side of the light guide panel; and
a second light emitting unit which is integrally formed with and disposed adjacent to a side of the first light emitting unit, and is disposed to face a second side of the light guide panel which is adjacent to the first side.

11. The backlight unit according to claim 10, wherein:
the reflecting plane comprises:
a first reflecting area disposed in proximity to a light emitting portion of the lamp where the first light emitting unit and the second light emitting unit are adjacent to each other, and
a second reflecting area disposed in proximity to at least one of an end part of the first light emitting unit and an end part of the second light emitting unit; and
the first reflecting area has a lower surface roughness than that of the second reflecting area.

12. The backlight unit according to claim 11, wherein:
the reflecting plane comprises a third reflecting area disposed in a position facing a central area of the light guide panel; and
the third reflecting area has a higher surface roughness than that of the second reflecting area.

13. A backlight unit, comprising:
a plurality of light emitting units to emit light; and
a light guide to guide the emitted light, the light guide comprising:
a plurality of light reflecting areas to each reflect the light emitted from the plurality of light emitting units in proportion to an amount of emitted light encountered by each of the plurality of light reflecting areas,
wherein a totality of the light reflected by the plurality of reflecting areas is a uniform reflected light
wherein the light reflecting areas which encounter a higher amount of emitted light from the plurality of light emitting units have a lower associated surface roughness and a higher associated reflectance than light reflecting areas which encounter a lower amount of emitted light from the plurality of light emitting units.

14. The backlight unit of claim 13, wherein the light guide includes a light emitting plane disposed on a surface of the light guide to correct the reflected light output to provide uniform reflected light.

15. The backlight unit of claim 14, wherein an optical sheet is disposed in proximity to the light emitting plane to provide the correction of the reflected light output.

16. A backlight unit, comprising:
a lamp having a continuous portion and a discontinuous portion; and
a light guide having a reflecting unit to guide the light emitted from the lamp, the reflecting unit comprising:
a first area having a first reflectance to correspond to the continuous portion; and a second area having a second reflectance to correspond to the discontinuous portion.

17. The backlight unit of claim 16, wherein:
the continuous portion comprises a plurality of continuous sub-portions disposed apart from each other by a distance which corresponds to the discontinuous portion;
the first area of the reflecting unit is disposed adjacent to the continuous portion; and
the second area of the reflecting unit is disposed adjacent to the discontinuous portion.

18. The backlight unit of claim 16, wherein the first reflectance is higher than the second reflectance.

19. The backlight unit of claim 16, further comprising:
a light guide panel disposed above the reflecting unit and in close proximity to the lamp such that light emitted from the lamp is reflected by the reflecting unit,
wherein the light emitted from the lamp and reflected by the reflecting unit is guided to outside the backlight unit.

20. The backlight unit of claim 16, wherein:
the first area has a first scattering ratio, and the second area has a second scattering ratio; and
the first scattering ratio of the first area is lower than that of the second area.

21. The backlight unit of claim 16, wherein the first area comprises a plurality of sub-areas each having a different reflectance.

22. A display apparatus, comprising:
a display panel to form an image thereon; and
a backlight unit having:
    a lamp having a continuous portion and a discontinuous portion; and
    a light guide having a reflecting unit having a first area having a first reflectance to correspond to the continuous portion, and a second area having a second reflectance to correspond to the discontinuous portion, to guide the light emitted from the lamp.

23. A display apparatus, comprising:
a display panel to form an image thereon; and
a backlight unit having:
    a light guide panel to guide entering light;
    a light source disposed on at least one side of the light guide panel, to emit light; and
    a reflecting sheet which is disposed on a surface of the light guide panel to reflect the entering light toward a light emitting plane of the light guide panel, and comprises a plurality of reflecting areas which have different reflectance, wherein a reflecting area of the plurality of reflecting areas which encounters a relatively large amount of the entering light has a higher reflectance than that of a reflecting area of the plurality of reflecting areas which encounters a relatively small amount of the entering light.

24. A display apparatus, comprising:
a display panel to form an image thereon; and
a backlight unit having:
    a light guide panel to guide entering light;
    a light source disposed on at least one side of the light guide panel, and to emit light; and
    a chassis to accommodate the light source and the light guide panel, and comprises a reflecting plane disposed on a surface of the chassis which faces the light guide panel, and is divided into a plurality of reflecting areas which have different illuminations, wherein the reflecting plane is provided so that a reflecting area of the plurality of reflecting areas which encounters a relatively large amount of the entering light has a lower surface roughness than that of a reflecting area of the plurality of reflecting areas which encounters a relatively small amount of the entering light.

* * * * *